United States Patent
Sommer et al.

(10) Patent No.: US 12,463,212 B2
(45) Date of Patent: Nov. 4, 2025

(54) PROCESS FOR MAKING AN ELECTRODE ACTIVE MATERIAL, AND ELECTRODE ACTIVE MATERIAL

(71) Applicant: BASF SE, Ludwigshafen am Rhein (DE)

(72) Inventors: Heino Sommer, Ludwigshafen (DE); Maraike Ahlf, Ludwigshafen (DE); Jacob Haag, Beachwood, OH (US); Regina Vogelsang, Ludwigshafen (DE); Fatih Cetinel, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 1431 days.

(21) Appl. No.: 16/968,322

(22) PCT Filed: Jan. 31, 2019

(86) PCT No.: PCT/EP2019/052330
§ 371 (c)(1),
(2) Date: Aug. 7, 2020

(87) PCT Pub. No.: WO2019/154702
PCT Pub. Date: Aug. 15, 2019

(65) Prior Publication Data
US 2021/0083285 A1 Mar. 18, 2021

(30) Foreign Application Priority Data
Feb. 9, 2018 (EP) .................... 18156095

(51) Int. Cl.
| H01M 4/52 | (2010.01) |
| C01G 53/50 | (2025.01) |
| H01M 4/36 | (2006.01) |
| H01M 4/50 | (2010.01) |
| H01M 4/505 | (2010.01) |
| H01M 4/525 | (2010.01) |
| H01M 4/62 | (2006.01) |
| H01M 10/05 | (2010.01) |
| H01M 10/0525 | (2010.01) |

(52) U.S. Cl.
CPC ............ *H01M 4/525* (2013.01); *C01G 53/50* (2013.01); *H01M 4/366* (2013.01); *H01M 4/505* (2013.01); *H01M 4/628* (2013.01); *H01M 10/0525* (2013.01); *C01P 2002/70* (2013.01); *C01P 2004/04* (2013.01)

(58) Field of Classification Search
None
See application file for complete search history.

(56) References Cited

U.S. PATENT DOCUMENTS

| 8,993,051 B2 | 3/2015 | Kelder et al. |
| 2017/0207455 A1* | 7/2017 | Watanabe ......... C23C 16/45555 |
| 2018/0026268 A1* | 1/2018 | Kim ..................... C01G 53/006 |
| | | 429/223 |

FOREIGN PATENT DOCUMENTS

| JP | 2014504781 | * | 2/2014 | |
| KR | 10-2018-0010122 A | | 1/2018 | |
| KR | 20180010122 | * | 1/2018 | ........ H01M 10/0525 |
| KR | 20180011207 | * | 1/2018 | |
| WO | WO 2019/154701 A1 | | 8/2019 | |

OTHER PUBLICATIONS

Kwang Soo Yoo, et al., Surface modification of Li(Ni0.6Co0.2Mn0.2)O2 cathode materials by nano-Al2O3 to improve electrochemical performance in lithium-ion batteries, Nov. 6, 2017, Materials MDPI AG Switzerland, vol. 10, 1273, pp. 1-11. (Year: 2017).*
International Search Report for PCT Patent Application No. PCT/EP2019/052330, issued on Jun. 3, 2019, 3 pages.
International Preliminary Report on Patentability issued on Oct. 7, 2019 in PCT/JP2019/052330 filed Jan. 31, 2019 (with English translation), 11 pages.
European Search Report for European Patent Application No. 18156095.4, issued on May 4, 2018, therein 3 pages.

(Continued)

*Primary Examiner* — Barbara L Gilliam
*Assistant Examiner* — Angela J Martin
(74) *Attorney, Agent, or Firm* — Armstrong Teasdale LLP

(57) ABSTRACT

Process for making a partially coated electrode active material wherein said process comprises the following steps: (a) Providing an electrode active material according to general formula $Li_{1+x}TM_{1+x}O_2$, wherein TM is a combination of Ni, Co and, optionally, Mn, and, optionally, at least one metal selected from Al, Ti and Zr, and x is in the range of from zero to 0.2, wherein at least 60 mole-% of the transition metal of TM is Ni, and wherein said electrode active material has a residual moisture content in the range of from 50 to 1,000 ppm, (b) treating said electrode active material with a metal alkoxide or metal halide or metal amide or alkyl metal compound, (c) treating the material obtained in step (b) with moisture, (d) repeating the sequence of steps (b) and (c) twice to ten times, (e) performing a post-treatment by heating the material obtained after the last step (d) at a temperature from 200 to 400° C.

14 Claims, No Drawings

(56) References Cited

OTHER PUBLICATIONS

David H. K. Jackson, et al., "Electrochemical Effects of Annealing on Atomic Layer Deposited $Al_2O_3$ Coatings on $LiNi_{0.5}Mn_{0.3}Co_{0.2}O_2$," Journal of Power Sources, vol. 365, Oct. 15, 2017, pp. 61-67.

Kwang Soo Yoo, et al., "Surface Modification of $Li(Ni_{0.6}Co_{0.2}Mn_{0.2})O_2$ Cathode Materials by Nano-$Al_2O9_3$ to Improve Electrochemical Performance in Lithium-Ion Batteries" Materials MDPI AG Switzerland, vol. 10, No. 11, XP002779631, Nov. 6, 2017, pp. 1-11.

\* cited by examiner

PROCESS FOR MAKING AN ELECTRODE ACTIVE MATERIAL, AND ELECTRODE ACTIVE MATERIAL

The present invention is directed towards a process for making a partially coated electrode active material wherein said process comprises the following steps:

(a) Providing an electrode active material according to general formula $Li_{1+x}TM_{1-x}O_2$, wherein TM is a combination of Ni, Co and, optionally, Mn, and, optionally, at least one metal selected from Al, Ti and Zr, and x is in the range of from zero to 0.2, wherein at least 60 mole-% of the transition metal of TM is Ni, and wherein said electrode active material has a residual moisture content in the range of from 50 to 1,000 ppm, (b) treating said electrode active material with a metal alkoxide or metal halide or metal amide or alkyl metal compound, (c) treating the material obtained in step (b) with moisture, (d) repeating the sequence of steps (b) and (c) twice to ten times, (e) performing a post-treatment by heating the material obtained after the last step (d) at a temperature from 200 to 400° C.

Lithium ion secondary batteries are modern devices for storing energy. Many application fields have been and are contemplated, from small devices such as mobile phones and laptop computers through car batteries and other batteries for e-mobility. Various components of the batteries have a decisive role with respect to the performance of the battery such as the electrolyte, the electrode materials, and the separator. Particular attention has been paid to the cathode materials. Several materials have been suggested, such as lithium iron phosphates, lithium cobalt oxides, and lithium nickel cobalt manganese oxides. Although extensive research has been performed the solutions found so far still leave room for improvement.

One problem of lithium ion batteries is attributed to undesired reactions on the surface of the cathode active materials. Such reactions may be a decomposition of the electrolyte or the solvent or both. It has thus been tried to protect the surface without hindering the lithium exchange during charging and discharging. Examples are attempts to coat the cathode active materials with, e.g., aluminium oxide or calcium oxide, see, e.g., U.S. Pat. No. 8,993,051.

The efficiency of the process, however, may still be improved. Especially in embodiments wherein the particles have a tendency to agglomerate the efficiency sometimes leaves room for improvement both in respect to reaction time and percentage of covered particles.

It was therefore an objective of the present invention to provide a process by which electrode active materials may be coated to reduce the tendency of resistance build-up during repeated cycling.

Accordingly, the process as defined at the outset has been found, hereinafter also referred to as inventive process or as process according to the (present) invention. The inventive process is a process for making a coated electrode active material.

The term "partially coated" as used in the context with the present invention refers to at least 80% of the particles of a batch of particulate material being coated, and to at least 75% of the surface of each particle being coated, for example 75 to 99.99% and preferably 80 to 90%.

The thickness of such coating may be very low, for example 0.1 to 5 nm. In other embodiments, the thickness may be in the range of from 6 to 15 nm. In further embodiments, the thickness of such coating is in the range of from 16 to 50 nm. The thickness in this context refers to an average thickness determined mathematically by calculating the amount of metal alkoxide or metal halide or metal amide or alkyl metal, respectively, per particle surface in $m^2$ and assuming a 100% conversion.

Without wishing to be bound by any theory, it is believed that non-coated parts of particles do not react due to specific chemical properties of the particles, for example density of chemically reactive groups such as, but not limited to hydroxyl groups, oxide moieties with chemical constraint, or to adsorbed water.

In one embodiment of the present invention the electrode active material has an average particle diameter (D50) in the range of from 3 to 20 µm, preferably from 5 to 16 µm. The average particle diameter can be determined, e.g., by light scattering or LASER diffraction or electroacoustic spectroscopy. The particles are usually composed of agglomerates from primary particles, and the above particle diameter refers to the secondary particle diameter.

In one embodiment of the present invention, the electrode active material has a specific surface (BET), hereinafter also referred to as "BET surface", in the range of from 0.1 to 1.5 $m^2/g$. The BET surface may be determined by nitrogen adsorption after outgassing of the sample at 200° C. for 30 minutes or more and beyond this accordance with DIN ISO 9277:2010.

The inventive process comprises three steps (a), (b) and (c), in the context of the present invention also referred to as step (a), step (b) and step (c).

Step (a) includes providing an electrode active material according to general formula $Li_{1+x}TM_{1-x}O_2$, wherein TM is a combination of Ni, Co and, optionally, Mn, and, optionally, at least one metal selected from Al, Ti, Mo, W, and Zr, and x is in the range of from zero to 0.2, wherein at least 60 mole-% of the transition metal of TM is Ni, and wherein said electrode active material has a residual moisture content in the range of from 50 to 1,000 ppm.

TM may be selected from combinations of Mn and Ni, or Ni and Co, or from combinations of Ni, Mn and Co, optionally in each case with at least one more metal selected from Al, Ti, Zr, W, and Mo, preferably at least one of Al, W, Ti and Zr. Preferred are combinations of Ni and Co and of Ni and Co and Mn, optionally in each case with at least one more metal selected from Al, W, Ti and Zr.

In a preferred embodiment, TM is a combination of metals according to general formula (I)

$$(Ni_aCo_bMn_c)_{1-d}M_d \qquad (I)$$

with
a being in the range of from 0.6 to 0.95,
b being in the range of from 0.025 to 0.2,
c being in the range of from 0.025 to 0.2, and
d being in the range of from zero to 0.1,
M is Al, and
a+b+c=1.

Particularly preferred are $Li_{(1+x)}[Ni_{0.6}Co_{0.2}Mn_{0.2}]_{(1-x)}O_2$, $Li_{(1+x)}[Ni_{0.7}Co_{0.2}Mn_{0.1}]_{(1-x)}O_2$, and $Li_{(1+x)}[Ni_{0.8}Co_{0.1}Mn_{0.1}]_{(1-x)}O_2$, each with x as defined above.

Said electrode active material is preferably provided without any additive such as conductive carbon or binder but as free-flowing powder.

Said cathode active material provided in step (a) has a residual moisture content in the range of from 50 to 1,000 ppm, preferably from 100 to 400 ppm. The residual moisture content may be determined by Karl-Fischer titration.

In step (b), said electrode active material is treated with a metal alkoxide or metal halide or metal amide or alkyl metal compound.

In one embodiment of the inventive process, step (b) is performed at a temperature in the range of from 15 to 1000° C., preferably 15 to 500° C., more preferably 20 to 350° C., and even more preferably 50 to 220° C. It is preferred to select a temperature in step (b) at which metal alkoxide or metal amide or alkyl metal compound, as the case may be, is in the gas phase.

In one embodiment of the present invention, step (b) is carried out at normal pressure but step (b) may as well be carried out at reduced or elevated pressure. For example, step (b) may be carried out at a pressure in the range of from 5 mbar to 1 bar above normal pressure, preferably 10 to 150 mbar above normal pressure. In the context of the present invention, normal pressure is 1 atm or 1013 mbar. In other embodiments, step (b) may be carried out at a pressure in the range of from 150 mbar to 560 mbar above normal pressure. In other embodiments, step (b) is carried out at a pressure of 100 to 1 mbar below normal pressure.

In a preferred embodiment of the present invention, alkyl metal compound or metal alkoxide or metal amide, respectively, is selected from $Al(R^1)_3$, $Al(R^1)_2OH$, $AlR^1(OH)_2$, $M^1(R^1)_{4-y}H_y$, $Al(OR^2)_3$, $M^1(OR^2)_4$, $M^1[NR^2]_4$, and methyl alumoxane, wherein $R^1$ are different or equal and selected from $C_1$-$C_8$-alkyl, straight-chain or branched, $R^2$ are different or equal and selected from $C_1$-$C_4$-alkyl, straight-chain or branched, $M^1$ is Ti or Zr, with Ti being preferred, Metal alkoxides may be selected from $C_1$-$C_4$-alkoxides of aluminum, and transition metals. Preferred transition metals are titanium and zirconium. Examples of alkoxides are methanolates, hereinafter also referred to as methoxides, ethanolates, hereinafter also referred to as ethoxides, propanolates, hereinafter also referred to as propoxides, and butanolates, hereinafter also referred to as butoxides. Specific examples of propoxides are n-propoxides and iso-propoxides. Specific examples of butoxides are n-butoxides, iso-butoxides, sec.-butoxides and tert.-butoxides. Combinations of alkoxides are feasible as well.

Preferred examples of metal $C_1$-$C_4$-alkoxides are $Ti[OCH(CH_3)_2]_4$, $Ti(OC_4H_9)_4$, $Zr(OC_4H_9)_4$, $Zr(OC_2H_5)_4$, $Al(OCH_3)_3$, $Al(OC_2H_5)_3$, $Al(O-n-C_3H_7)_3$, $Al(O-iso-C_3H_7)_3$, $Al(O-sec.-C_4H_9)_3$, and $Al(OC_2H_5)(O-sec.-C_4H_9)_2$.

Examples of aluminum alkyl compounds are trimethyl aluminum, triethyl aluminum, triisobutyl aluminum, and methyl alumoxane.

Metal amides are sometimes also referred to as metal imides. Examples of metal amides are $Zr[N(C_2H_5)_2]_4$, $Zr[N(CH_3)_2]_4$, $Zr[(CH_3)N(C_2H_5)]_4$ and $Ti[N(CH_3)_2]_4$.

Particularly preferred compounds are selected from metal $C_1$-$C_4$-alkoxides and metal alkyl compounds, and even more preferred is trimethyl aluminum.

In one embodiment of the present invention, the amount of metal alkoxide or metal amide or alkyl metal compound is in the range of 0.1 to 1 g/kg electrode active material.

Preferably, the amount of metal alkoxide or metal amide or alkyl metal compound, respectively, is calculated to amount to 80 to 200% of a monomolecular layer on the electrode active material per cycle.

Step (b) of the inventive process as well as step (c)—that will be discussed in more detail below—may be carried out in the same or in different vessels.

In one embodiment of the present invention, step (b) is performed in a rotary kiln, in a free fall mixer, in a continuous vibrating bed or a fluidized bed.

In a preferred embodiment of the present invention, the duration of step (b) is in the range of from 1 second to 2 hours, preferably 1 second up to 10 minutes.

In a third step, in the context of the present invention also referred to as step (c), the material obtained in step (b) is treated with moisture.

In one embodiment of the present invention, step (c) is carried out at a temperature in the range of from 50 to 250° C.

In one embodiment of the present invention, step (c) is carried out at normal pressure but step (c) may as well be carried out at reduced or elevated pressure. For example, step (c) may be carried out at a pressure in the range of from 5 mbar to 1 bar above normal pressure, preferably 10 to 250 mbar above normal pressure. In the context of the present invention, normal pressure is ambient pressure, for example 1 atm or 1013 mbar at sea level. In different altitudes, ambient pressure may be lower. In other embodiments, step (c) may be carried out at a pressure in the range of from 150 mbar to 560 mbar above normal pressure.

Steps (b) and (c) may be carried out at the same pressure or at different pressures, preferred is at the same pressure.

Said moisture may be introduced, e.g., by treating the material obtained in accordance with step (b) with moisture saturated inert gas, for example with moisture saturated nitrogen or moisture saturated noble gas, for example argon. Saturation may refer to normal conditions or to the reaction conditions in step (c).

In one embodiment of the present invention, step (c) is performed in a rotary kiln, in a free fall mixer, in a continuous vibrating bed or a fluidized bed.

In a preferred embodiment of the present invention, the duration of step (c) is in the range of from 1 second to 2 hours, preferably 1 second up to 5 minutes.

In one embodiment of the present invention, the reactor in which the inventive process is carried out is flushed or purged with an inert gas between steps (b) and (c), for example with dry nitrogen or with dry argon. Suitable flushing—or purging—times are 1 second to 30 minutes, preferably 1 second to 10 minutes. It is preferred that the amount of inert gas is sufficient to exchange the contents of the reactor of from one to 15 times. By such flushing or purging, the production of by-products such as separate particles of reaction product of metal alkoxide or metal amide or alkyl metal compound, respectively, with water can be avoided. In the case of the couple trimethyl aluminum and water, such by-products are methane and alumina or trimethyl aluminum that is not deposited on the particulate material, the latter being an undesired by-product. Said flushing may also take place after step (c), thus before another step (b). In this context, "dry" refers to a water content of less than 10 ppm by weight, for example 3 to 5 ppm.

In one embodiment of the present invention, each flushing step between (b) and (c) has a duration in the range of from one second to ten minutes.

In one embodiment of the present invention, the reactor is evacuated between steps (b) and (c). Said evacuating may also take place after step (c), thus before another step (b). Evacuation in this context includes any pressure reduction, for example 10 to 1,000 mbar (abs), preferably 10 to 500 mbar (abs).

Each of steps (b) and (c) may be carried out in a fixed bed reactor, in a fluidized bed reactor, in a forced flow reactor or in a mixer, for example in a compulsory mixer or in a free-fall mixer. Examples of fluidized bed reactors are spouted bed reactors. Examples of compulsory mixers are ploughshare mixers, paddle mixers and shovel mixers. Preferred are ploughshare mixers. Preferred ploughshare mixers are installed horizontally, the term horizontal referring to the axis around which the mixing element rotates. Preferably, the inventive process is carried out in a shovel mixing tool, in a paddle mixing tool, in a Becker blade mixing tool and, most preferably, in a ploughshare mixer in accordance with the hurling and whirling principle. Free fall mixers are using the gravitational force to achieve mixing. In a preferred embodiment, steps (b) and (c) of the inventive process are carried out in a drum or pipe-shaped vessel that rotates around its horizontal axis. In a more preferred embodiment, steps (b) and (c) of the inventive process are carried out in a rotating vessel that has baffles.

In one embodiment of the present invention, the rotating vessel has in the range of from 2 to 100 baffles, preferably 2 to 20 baffles. Such baffles are preferably flush mount with respect to the vessel wall.

In one embodiment of the present invention, such baffles are axially symmetrically arranged along the rotating vessel, drum, or pipe. The angle with the wall of said rotating vessel is in the range of from 5 to 45°, preferably 10 to 20°. By such arrangement, they can transport coated cathode active material very efficiently through the rotating vessel.

In one embodiment of the present invention, said baffles reach in the range of from 10 to 30% into the rotating vessel, referring to the diameter.

In one embodiment of the present invention, said baffles cover in the range of from 10 to 100%, preferably 30 to 80% of the entire length of the rotating vessel. In this context, the term length is parallel to the axis of rotation.

In a preferred embodiment of the present invention the inventive process comprises the step of removing the coated material from the vessel or vessels, respectively, by pneumatic conveying, e.g. 20 to 100 m/s.

In one embodiment of the present invention, the exhaust gasses are treated with water at a pressure above one bar and even more preferably higher than in the reactor in which steps (b) and (c) are performed, for example in the range of from 1.010 to 2.1 bar, preferably in the range of from 1.005 to 1.150 bar. The elevated pressure is advantageous to compensate for the pressure loss in the exhaust lines.

Step (d) includes repeating the sequence of steps (b) and (c) twice to ten times.

Repetition may include repeating a sequence of steps (b) and (c) each time under exactly the same conditions or under modified conditions but still within the range of the above definitions. For example, each step (b) may be performed under exactly the same conditions, or, e.g., each step (b) may be performed under different temperature conditions or with a different duration, for example 120° C., then 10° C. and 160° C. each from 1 second to 1 hour.

In step (e), a post-treatment is performed by heating the material obtained after the last step (d) at a temperature from 200 to 400° C., preferred are 250 to 350° C.

In a preferred embodiment of the present invention, step (e) is carried out in an atmosphere of inert gas, for example nitrogen or a noble gas such as argon. Preferably, such inert gas has a water content in the range of from 50 to 400 ppm, preferably 100 to 200 ppm, and a carbon dioxide content ion the range of from 50 to 400 ppm. The $CO_2$ content may be determined by, e.g., optical methods using infrared light.

In one embodiment of the present invention, step (e) has a duration in the range of from 10 seconds to 2 hours, preferred are 10 minutes to 2 hours.

In a preferred embodiment, step (e) is carried out at normal pressure.

Step (e) may be performed in a rotary kiln. In special embodiments, step (e) may be performed in the same vessel as step (c).

A further aspect of the present invention is directed towards a particulate electrode active material, hereinafter also referred to as inventive electrode active material. Inventive electrode material has the general formula $Li_{1+x}TM_{1-x}O_2$, wherein TM is a combination of Ni, Co and, optionally, Mn, and, optionally, at least one metal selected from Al, Ti, Mo, W and Zr, and x is in the range of from zero to 0.2, wherein at least 60 mole-% of the transition metal of TM is Ni, and the outer surface of said particles is non-homogeneously coated with an acidic oxide selected from acidic aluminum oxyhydroxide, acidic alumina, acidic titania and acidic zirconia. Preferred are acidic aluminum oxyhydroxide and acidic alumina.

The non-homogeneous coating may be mapped by X-ray Photoelectron Spectroscopy ("XPS") or Transmission Electron Microscopy with Energy Dispersive X-ray Spectroscopy ("TEM-EDX").

TM has been defined above.

Preferably, TM in inventive particulate material is selected from $Ni_{0.6}Co_{0.2}Mn_{0.2}$, $Ni_{0.7}Co_{0.2}Mn_{0.1}$ and $Ni_{0.8}Co_{0.1}Mn_{0.1}$ and said acidic oxide is selected from acidic aluminum oxyhydroxide and acidic alumina.

In one embodiment of the present invention inventive electrode active material has an average particle diameter (D50) in the range of from 3 to 20 µm, preferably from 5 to 16 µm. The average particle diameter can be determined, e.g., by light scattering or LASER diffraction or electroacoustic spectroscopy. The particles are usually composed of agglomerates from primary particles, and the above particle diameter refers to the secondary particle diameter.

In one embodiment of the present invention, inventive electrode active material has a specific surface ("BET surface") in the range of from 0.1 to 1.5 m²/g. The BET surface may be determined by nitrogen adsorption after outgassing of the sample at 200° C. for 30 minutes or more accordance with DIN ISO 9277:2010.

In one embodiment of the present invention, the non-homogeneous coating has an average thickness in the range of from 0.2 to 2 nm, preferably 0.3 to 0.8 nm.

Inventive electrode active materials are very well suited for cathodes in lithium ion batteries. They exhibit a low resistance build-up in the cause of repeated cycling, for example 500 or more cycles.

A further aspect of the present invention refers to electrodes comprising at least one electrode material active according to the present invention. They are particularly useful for lithium ion batteries. Lithium ion batteries comprising at least one electrode according to the present invention exhibit a good discharge behavior. Electrodes comprising at least one electrode active material according to the present invention are hereinafter also referred to as inventive cathodes or cathodes according to the present invention.

Cathodes according to the present invention can comprise further components. They can comprise a current collector, such as, but not limited to, an aluminum foil. They can further comprise conductive carbon and a binder.

Suitable binders are preferably selected from organic (co)polymers. Suitable (co)polymers, i.e. homopolymers or copolymers, can be selected, for example, from (co)polymers obtainable by anionic, catalytic or free-radical (co)polymerization, especially from polyethylene, polyacrylonitrile, polybutadiene, polystyrene, and copolymers of at least two comonomers selected from ethylene, propylene, styrene, (meth)acrylonitrile and 1,3-butadiene. Polypropylene is also suitable. Polyisoprene and polyacrylates are additionally suitable. Particular preference is given to polyacrylonitrile.

In the context of the present invention, polyacrylonitrile is understood to mean not only polyacrylonitrile homopolymers but also copolymers of acrylonitrile with 1,3-butadiene or styrene. Preference is given to polyacrylonitrile homopolymers.

In the context of the present invention, polyethylene is not only understood to mean homopolyethylene, but also copolymers of ethylene which comprise at least 50 mol % of copolymerized ethylene and up to 50 mol % of at least one further comonomer, for example α-olefins such as propylene, butylene (1-butene), 1-hexene, 1-octene, 1-decene, 1-dodecene, 1-pentene, and also isobutene, vinylaromatics, for example styrene, and also (meth)acrylic acid, vinyl acetate, vinyl propionate, $C_1$-$C_{10}$-alkyl esters of (meth)acrylic acid, especially methyl acrylate, methyl methacrylate, ethyl acrylate, ethyl methacrylate, n-butyl acrylate, 2-ethylhexyl acrylate, n-butyl methacrylate, 2-ethylhexyl methacrylate, and also maleic acid, maleic anhydride and itaconic anhydride. Polyethylene may be HDPE or LDPE.

In the context of the present invention, polypropylene is not only understood to mean homopolypropylene, but also copolymers of propylene which comprise at least 50 mol % of copolymerized propylene and up to 50 mol % of at least one further comonomer, for example ethylene and α-olefins such as butylene, 1-hexene, 1-octene, 1-decene, 1-dodecene and 1-pentene. Polypropylene is preferably isotactic or essentially isotactic polypropylene.

In the context of the present invention, polystyrene is not only understood to mean homopolymers of styrene, but also copolymers with acrylonitrile, 1,3-butadiene, (meth)acrylic acid, $C_1$-$C_{10}$-alkyl esters of (meth)acrylic acid, divinylbenzene, especially 1,3-divinylbenzene, 1,2-diphenylethylene and α-methylstyrene.

Another preferred binder is polybutadiene.

Other suitable binders are selected from polyethylene oxide (PEO), cellulose, carboxymethylcellulose, polyimides and polyvinyl alcohol.

In one embodiment of the present invention, binder is selected from those (co)polymers which have an average molecular weight $M_w$ in the range from 50,000 to 1,000,000 g/mol, preferably to 500,000 g/mol.

Binder may be cross-linked or non-cross-linked (co)polymers.

In a particularly preferred embodiment of the present invention, binder is selected from halogenated (co)polymers, especially from fluorinated (co)polymers. Halogenated or fluorinated (co)polymers are understood to mean those (co)polymers which comprise at least one (co)polymerized (co)monomer which has at least one halogen atom or at least one fluorine atom per molecule, more preferably at least two halogen atoms or at least two fluorine atoms per molecule. Examples are polyvinyl chloride, polyvinylidene chloride, polytetrafluoroethylene, polyvinylidene fluoride (PVdF), tetrafluoroethylene-hexafluoropropylene copolymers, vinylidene fluoride-hexafluoropropylene copolymers (PVdF-HFP), vinylidene fluoride-tetrafluoroethylene copolymers, perfluoroalkyl vinyl ether copolymers, ethylene-tetrafluoroethylene copolymers, vinylidene fluoride-chlorotrifluoroethylene copolymers and ethylene-chlorofluoroethylene copolymers.

Suitable binders are especially polyvinyl alcohol and halogenated (co)polymers, for example polyvinyl chloride or polyvinylidene chloride, especially fluorinated (co)polymers such as polyvinyl fluoride and especially polyvinylidene fluoride and polytetrafluoroethylene.

Inventive cathodes may comprise 1 to 15% by weight of binder(s), referring to electrode active material. In other embodiments, inventive cathodes may comprise 0.1 up to less than 1% by weight of binder(s).

A further aspect of the present invention is a battery, containing at least one cathode comprising inventive electrode active material, carbon, and binder, at least one anode, and at least one electrolyte.

Embodiments of inventive cathodes have been described above in detail.

Said anode may contain at least one anode active material, such as carbon (graphite), $TiO_2$, lithium titanium oxide, silicon, lithium or tin. Said anode may additionally contain a current collector, for example a metal foil such as a copper foil.

Said electrolyte may comprise at least one non-aqueous solvent, at least one electrolyte salt and, optionally, additives.

Non-aqueous solvents for electrolytes can be liquid or solid at room temperature and is preferably selected from among polymers, cyclic or acyclic ethers, cyclic and acyclic acetals and cyclic or acyclic organic carbonates.

Examples of suitable polymers are, in particular, polyalkylene glycols, preferably poly-$C_1$-$C_4$-alkylene glycols and in particular polyethylene glycols. Polyethylene glycols can here comprise up to 20 mol % of one or more $C_1$-$C_4$-alkylene glycols. Polyalkylene glycols are preferably polyalkylene glycols having two methyl or ethyl end caps.

The molecular weight $M_w$ of suitable polyalkylene glycols and in particular suitable polyethylene glycols can be at least 400 g/mol.

The molecular weight $M_w$ of suitable polyalkylene glycols and in particular suitable polyethylene glycols can be up to 5 000 000 g/mol, preferably up to 2 000 000 g/mol.

Examples of suitable acyclic ethers are, for example, diisopropyl ether, di-n-butyl ether, 1,2-dimethoxyethane, 1,2-diethoxyethane, with preference being given to 1,2-dimethoxyethane.

Examples of suitable cyclic ethers are tetrahydrofuran and 1,4-dioxane.

Examples of suitable acyclic acetals are, for example, dimethoxymethane, diethoxymethane, 1,1-dimethoxyethane and 1,1-diethoxyethane.

Examples of suitable cyclic acetals are 1,3-dioxane and in particular 1,3-dioxolane.

Examples of suitable acyclic organic carbonates are dimethyl carbonate, ethyl methyl carbonate and diethyl carbonate.

Examples of suitable cyclic organic carbonates are compounds of the general formulae (III) and (IV)

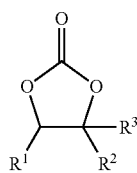

(III)

-continued

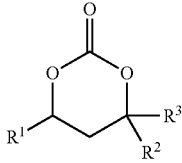
(IV)

where $R^1$, $R^2$ and $R^3$ can be identical or different and are selected from among hydrogen and $C_1$-$C_4$-alkyl, for example methyl, ethyl, n-propyl, isopropyl, n-butyl, isobutyl, sec-butyl and tert-butyl, with $R^2$ and $R^3$ preferably not both being tert-butyl.

In particularly preferred embodiments, $R^1$ is methyl and $R^2$ and $R^3$ are each hydrogen, or $R^1$, $R^2$ and $R^3$ are each hydrogen.

Another preferred cyclic organic carbonate is vinylene carbonate, formula (V).

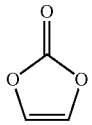
(V)

The solvent or solvents is/are preferably used in the water-free state, i.e. with a water content in the range from 1 ppm to 0.1% by weight, which can be determined, for example, by Karl-Fischer titration.

Electrolyte (C) further comprises at least one electrolyte salt. Suitable electrolyte salts are, in particular, lithium salts. Examples of suitable lithium salts are $LiPF_6$, $LiBF_4$, $LiClO_4$, $LiAsF_6$, $LiCF_3SO_3$, $LiC(C_nF_{2n+1}SO_2)_3$, lithium imides such as $LiN(C_nF_{2n+1}SO_2)_2$, where n is an integer in the range from 1 to 20, $LiN(SO_2F)_2$, $Li_2SiF_6$, $LiSbF_6$, $LiAlCl_4$ and salts of the general formula $(C_nF_{2n+1}SO_2)_tYLi$, where m is defined as follows:

t=1, when Y is selected from among oxygen and sulfur,
t=2, when Y is selected from among nitrogen and phosphorus, and
t=3, when Y is selected from among carbon and silicon.

Preferred electrolyte salts are selected from among $LiC(CF_3SO_2)_3$, $LiN(CF_3SO_2)_2$, $LiPF_6$, $LiBF_4$, $LiClO_4$, with particular preference being given to $LiPF_6$ and $LiN(CF_3SO_2)_2$.

In an embodiment of the present invention, batteries according to the invention comprise one or more separators by means of which the electrodes are mechanically separated. Suitable separators are polymer films, in particular porous polymer films, which are unreactive toward metallic lithium. Particularly suitable materials for separators are polyolefins, in particular film-forming porous polyethylene and film-forming porous polypropylene.

Separators composed of polyolefin, in particular polyethylene or polypropylene, can have a porosity in the range from 35 to 45%. Suitable pore diameters are, for example, in the range from 30 to 500 nm.

In another embodiment of the present invention, separators can be selected from among PET nonwovens filled with inorganic particles. Such separators can have porosities in the range from 40 to 55%. Suitable pore diameters are, for example, in the range from 80 to 750 nm.

Batteries according to the invention further comprise a housing which can have any shape, for example cuboidal or the shape of a cylindrical disk or a cylindrical can. In one variant, a metal foil configured as a pouch is used as housing.

Batteries according to the invention display a good discharge behavior, for example at low temperatures (zero ° C. or below, for example down to −10° C. or even less), a very good discharge and cycling behavior, in particular at high temperatures (45° C. or higher, for example up to 60° C.) in particular with respect to the capacity loss, and a good safety behavior at high temperatures such as 60° C. or more. Preferably, also the cycle stability and the C-rate capacity behavior are improved, or they are at least identical although the Li content is lower.

Batteries according to the invention can comprise two or more electrochemical cells that combined with one another, for example can be connected in series or connected in parallel. Connection in series is preferred. In batteries according to the present invention, at least one of the electrochemical cells contains at least one cathode according to the invention. Preferably, in electrochemical cells according to the present invention, the majority of the electrochemical cells contains a cathode according to the present invention. Even more preferably, in batteries according to the present invention all the electrochemical cells contain cathodes according to the present invention.

The present invention further provides for the use of batteries according to the invention in appliances, in particular in mobile appliances. Examples of mobile appliances are vehicles, for example automobiles, bicycles, aircraft or water vehicles such as boats or ships. Other examples of mobile appliances are those which move manually, for example computers, especially laptops, telephones or electric hand tools, for example in the building sector, especially drills, battery-powered screwdrivers or battery-powered staplers.

The invention is further illustrated by working examples.

I. Cathode Active Materials

I.1. Preparation of a Precursor for Cathode Active Materials

A stirred tank reactor was filled with deionized water. The precipitation of mixed transition metal hydroxide precursor was started by simultaneous feed of an aqueous transition metal solution and an alkaline precipitation agent at a flow rate ratio of 1.9, and a total flow rate resulting in a residence time of 8 hours. The aqueous transition metal solution contained Ni, Co and Mn at a molar ratio of 6:2:2 as sulfates each and a total transition metal concentration of 1.65 mol/kg. The alkaline precipitation agent consisted of 25 wt. % sodium hydroxide solution and 25 wt. % ammonia solution in a weight ratio of 25. The pH value was kept at 12.0 by separate feed of an aqueous sodium hydroxide solution. After stabilization of particle size the resulting suspension was removed continuously from the stirred vessel. The mixed transition metal (TM) oxyhydroxide precursor was obtained by filtration of the resulting suspension, washing with distilled water, drying at 120° C. in air and sieving.

I.2. Manufacture of Cathode Active Materials

C-CAM.1 (Comparative): The mixed transition metal oxyhydroxide precursor obtained according to 1.1 was mixed with $Al_2O_3$ (average particle diameter 6 nm) and LiOH monohydrate to obtain a concentration of 0.3 mole-% Al relative to Ni+Co+Mn+Al and a Li/(TM+Al) molar ratio of 1.03. The mixture was heated to 885° C. and kept for 8 hours in a forced flow of oxygen to obtain the electrode active material C-CAM 1.

D50=9.5 μm determined using the technique of laser diffraction in a Mastersize 3000 instrument from Malvern Instruments. Al-content was determined by ICP analytics and corresponded to 820 ppm. Residual moisture at 250° C. was determined to be 300 ppm.

C-CAM.2 (Comparative): A fluidized bed reactor with external heating jacket was charged with 1500 g of C-CAM.1, and under an average pressure of 130 mbar C-CAM.1 was fluidized. The fluidized bed reactor was heated to 180° C. and kept at 180° C. for 3 h. Trimethylaluminum (TMA) in the gaseous state was introduced into the fluidized bed reactor through a filter plate by opening a valve to a precursor reservoir that contained TMA in liquid form and that was kept at 50° C. The TMA was diluted with nitrogen as carrier gas. After a reaction period of 150 seconds non-reacted TMA was removed through the nitrogen stream, and the reactor was purged with nitrogen. Then, water in the gaseous state was introduced into the fluidized bed reactor by opening a valve to a reservoir that contained liquid water kept at 24° C. After a reaction period of 150 seconds non-reacted water was removed through the nitrogen stream, and the reactor was purged with nitrogen. The above sequence was repeated for three times. The reactor was cooled to 25° C. and the material was discharged. The resultant C-CAM.2 displayed the following properties: D50=10.6 μm determined using the technique of laser diffraction in a Mastersize 3000 instrument from Malvern Instruments. Al-content: 1235 ppm, determined by ICP analytics. Residual moisture at 250° C. was determined to be 105 ppm.

CAM.3 (Inventive): 200 g of C-CAM.2 is kept under vacuum for 1 h inside a glass flask. After this, the flask is purged with $N_2$ and heated to 300° C. with 3K/min and kept for 2 hours in a forced flow of $N_2$ to obtain the inventive CAM.3. Residual moisture at 250° C. was determined to be 100 ppm. CAM.3 was partially coated with acidic $Al_2O_3$.

II Electrochemical Cells

II.1. Manufacture of Electrodes for Electrochemical Testing

The positive electrodes for the electrochemical cycling experiments in single layer pouch cells were prepared by coating on aluminum foil (thickness=20 μm) using a continuous doctor knife coating system with subsequent drying (Mathis, KTF-S) a slurry containing 94 wt. % cathode active material (94 wt. %), 1 wt. % active carbon (Super C65 L purchased form Imerys), 2 wt. % graphite (SFG6L from Imerys) and 3 wt. % polyvinylidene fluoride (PVdF) binders suspended in N-methyl-2-pyrrolidinone (NMP). Typically, all the slurries were prepared based on at least 30 g of cathode active material and the amount of NMP employed was such that the total solid content (CAM+SuperC65 L+SFG6L+PVdF) was ca. 65%. Before the cell assembly, the electrode tapes were dried in a hot-air chamber at 120° C. over a period of 16 hours and finally pressed using a roll calendar.

II.2. Electrochemical Testing in Half-Cells

Electrochemical testings of cathode active materials (C-CAM.1, C-CAM.2, and CAM.3) were carried out in coin half cells (vs. Li metal as anode material, 1M $LiPF_6$ in EC:EMC wt % as electrolyte (EC=ethylene carbonate, EMC=ethyl methyl carbonate), GF/D glass fiber separator (Whatman), and CR2032 from Hohsen Corp.) to obtain a $1^{st}$ cycle discharge capacity.

TABLE 1

Results obtained from electrochemical cells of cathode active materials vs. Li metal anode

| CAM No. | $1^{st}$ discharge capacities at 25° C. and 0.1 C. | Efficiency [%] |
|---|---|---|
| C-CAM.1 | 179.5 | 90.2 |
| C-CAM.2 | 178.8 | 89.6 |
| CAM.3 | 180.2 | 89.5 |

III Evaluation of Electrochemical Cells (Single Layer Pouch Cells)

Commercial graphite-coated tapes from Elexcel Corporation Ltd. were used as negative electrodes. The positive electrode comprising a cathode active material as described above, negative composite electrodes and a polypropylene separator (Celgard 2500 separator) were used to manufacture single layer pouch cells. Thereafter, all cells were filled with electrolyte (1M $LiPF_6$ in EC:DEC 3:7 wt % and VC 2 wt %, (DEC=diethyl carbonate, VC=vinylene carbonate)) in an argon-filled glove box having oxygen and water levels below 1.0 ppm and their electrochemical testing carried out in a Maccor 4000 battery-test system.

III.1. Formation at 25° C.

Pouch cells prepared comprising a cathode as described above and graphite anode were charged at a constant current of 0.1 C to a voltage of 4.25 V (CC charge). After degassing the cells, these are discharged at 0.1 C (3.0 V cut-off) (Cycle 1). Immediately after, the cells are charged at 25° C. at a constant current of 0.1 C to a voltage of 4.25 V (CC) and discharged at 0.1 C (3.0 V cut-off) (Cycle 2). Then, the cells are charged at a constant current of 0.5 C to a voltage of 4.25 V, charged at 4.25 V (CCCV) for either 60 minutes or until the current drops below 0.02 C and then the cells are discharged to a discharge voltage of 3 V at a constant current of 0.5 C (4 times, cycles 3 to 7). The cells were further cycled using the same charge conditions as in cycle 3 but using a discharge current of 1 C (2 times, cycles 7 to 8), 2 C (2 times, cycles 9 to 10) and 3 C (2 times, cycles 11 to 12). Finally, the cells are charged and discharged 10 times following the same procedure as that used in cycle 3.

III.2. Evaluation of Cycling of Pouch Cell at 45° C. (Cycling) and 25° C. (Resistance Measurements) Using 4.25 V as Upper Cut-Off Voltage Once the cells are formed, as described above, are charged at 25° C. a constant current of 0.2 C to a voltage of 4.25 V, charged at 4.25 V (CCCV) for either 60 minutes or until the current drops below 0.02 C and then the cells are discharged to a discharge voltage of 3 V at a constant current of 0.2 C. This procedure is repeated once and the discharge capacity is taken as the reference capacity for the next cycle. In this cycle, the cells are charge at a constant current of 0.2 C up to 75% of the reference capacity (75% state-of-charge=75% SoC) determined previously. Immediately after a 2.5 C current pulse was applied for 30 seconds (cell resistance measurement) in order to determine the cell resistance. The cells were then discharged at a constant current of 0.2 C to 50% and 25% SoC and cell resistance measurements were repeated for each of these SoC values. The cells are then further discharged to 3.0 V at a constant current of 0.2 C. Following the above cell resistance measurements, the cells are transferred to a climate chamber kept at a constant temperature of 45° C. After a 12-hour equilibration time, the cells are charged at a constant current of 1 C to a voltage of 4.25 V, charged at 4.25 V (CCCV) for either 60 minutes or until the current drops below 0.02 C and then the cells are discharged to a discharge voltage of 3 V at a constant current of 1 C (100 times).

The complete sequence above described (resistance measurements at various SoC values at 25° C. and 1 C cycling at 45° C.) was repeated at least 5 times. The results after 500 cycles at 1 C and 45° C. from the various examples are presented in Table 2 and expressed as percentages relative to the values obtained at the beginning of the procedure.

TABLE 2

Results obtained from electrochemical cells

| CAM No. | Remaining capacity at 45° C. after 300 cycles at 1 C. [%] | Cell resistance increase at 25° C. at 50% SoC [%] |
|---|---|---|
| C-CAM.1 | 90.2 | 263 |
| C-CAM.2 | 93.3 | 145 |
| CAM.3 | 93.2 | 145 |

| CAM No. | Remaining capacity at 45° C. after 400 cycles at 1 C. [%] | Cell resistance increase at 25° C. at 50% SoC [%] |
|---|---|---|
| C-CAM.1 | 84.5 | 305 |
| C-CAM.2 | 91.6 | 167 |
| CAM.3 | 91.7 | 156 |

| CAM No. | Remaining capacity at 45° C. after 500 cycles at 1 C. [%] | Cell resistance increase at 25° C. at 50% SoC [%] |
|---|---|---|
| C-CAM.1 | 77.9 | 357 |
| C-CAM.2 | 88.9 | 185 |
| CAM.3 | 90.5 | 166 |

| CAM No. | Remaining capacity at 45° C. after 600 cycles at 1 C. [%] | Cell resistance increase at 25° C. at 50% SoC [%] |
|---|---|---|
| C-CAM.1 | — | — |
| C-CAM.2 | 81.8 | 221 |
| CAM.3 | 89.2 | 179 |

The invention claimed is:

1. A process for making a non-homogeneously coated electrode active material, the process comprising:
  (a) providing an electrode active material according to the following formula
    $Li_{1+x}TM_{1-x}O_2$,
  wherein TM is a combination of Ni, Co, optionally Mn, and optionally at least one metal selected from the group consisting of Al, Ti, and Zr,
  x is in a range of from 0 to 0.2,
  at least 60 mole-% of the transition metal of TM is Ni, and said electrode active material has a residual moisture content in a range of from 50 to 1,000 ppm,
  (b) treating said electrode active material with a metal alkoxide, metal halide, metal amide, or alkyl metal compound,
  (c) treating the material obtained in (b) with moisture,
  (d) repeating the sequence of (b) and (c) two to ten times, and
  (e) performing a post-treatment by heating the material obtained after the last repetition of (d) at a temperature in a range of from 200 to 400° C.;
wherein the non-homogeneously coated electrode active material is not fully coated.

2. The process of claim 1, wherein TM is a combination of metals according to the following formula (I)

$$(Ni_aCo_bMn_c)_{1-d}M_d \qquad (I)$$

wherein
  a is in a range of from 0.6 to 0.9,
  b is in a range of from 0.05 to 0.2,
  c is in a range of from 0.05 to 0.2,
  d is in a range of from 0 to 0.1,
  M is Al, and
  a+b+c=1.

3. The process of claim 1, wherein (b) is performed in a rotary kiln, a free fall mixer, a continuous vibrating bed, or a fluidized bed.

4. The process of claim 1, wherein the alkyl metal compound of (c) is selected from the group consisting of trimethylaluminum, and triethylaluminum.

5. The process of claim 1, wherein each flushing step between (b) and (c) has a duration in a range of from 1 second to 10 minutes.

6. The process of claim 1, wherein (b) to (c) are performed in a free-fall mixer.

7. The process of claim 1, wherein (b) to (c), and (e) are performed in a fluidized bed.

8. The process of claim 1, wherein TM is selected from the group consisting of $Ni_{0.6}Co_{0.2}Mn_{0.2}$, $Ni_{0.7}Co_{0.2}Mn_{0.1}$, and $Ni_{0.8}Co_{0.1}Mn_{0.1}$.

9. The process of claim 1, wherein (e) is performed in an atmosphere of inert gas.

10. The process of claim 1, wherein (e) has a duration in a range of from 10 minutes to 2 hours.

11. A particulate electrode active material according to the following formula $Li_{1+x}TM_{1-x}O_2$, wherein TM is a combination of Ni, Co, optionally Mn, and optionally at least one metal selected from Al, Ti, and Zr,
x is in a range of from 0 to 0.2,
at least 60 mole-% of the transition metal of TM is Ni, and
  an outer surface of said particles is non-homogeneously coated with an acidic oxide selected from the group consisting of acidic aluminum oxyhydroxide, and acidic alumina.

12. The particulate electrode active material of claim 11, wherein TM is selected from the group consisting of $Ni_{0.6}Co_{0.2}Mn_{0.2}$, $Ni_{0.7}Co_{0.2}Mn_{0.1}$, and $Ni_{0.8}Co_{0.1}Mn_{0.1}$ and said acidic oxide is selected from the group consisting of acidic aluminum oxyhydroxide, and acidic alumina.

13. A process of manufacturing a lithium ion battery, the process comprising obtaining the particulate electrode active material of claim 11.

14. The process of claim 1, wherein the non-homogeneous coating is mapped by X-ray Photoelectron Spectroscopy or Transmission Electron Microscopy with Energy Dispersive X-ray Spectroscopy.

\* \* \* \* \*